(12) United States Patent
Takeuchi et al.

(10) Patent No.: US 6,634,264 B1
(45) Date of Patent: Oct. 21, 2003

(54) CAPSTAN REST

(75) Inventors: Yoji Takeuchi, Sayama (JP); Tamotsu Emura, Sayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/763,132

(22) PCT Filed: Aug. 21, 1998

(86) PCT No.: PCT/JP98/03716

§ 371 (c)(1),
(2), (4) Date: Feb. 20, 2001

(87) PCT Pub. No.: WO00/10758

PCT Pub. Date: Mar. 2, 2000

(51) Int. Cl.⁷ .............................. B23B 7/00; B23B 15/30
(52) U.S. Cl. .......................................... 82/118; 82/121
(58) Field of Search .......................... 82/118, 120, 131; 27/27 C, 35.5, 39, 48.5 R, 48.5 A; 74/813, 814, 815, 816, 817, 818, 819, 820, 821, 822, 823, 824, 825, 826, 827; 408/35; 192/93 R

(56) References Cited

U.S. PATENT DOCUMENTS

| | | | | |
|---|---|---|---|---|
| 3,893,191 A | * | 7/1975 | Gold et al. ............... 192/18 B |
| 4,223,579 A | * | 9/1980 | Stark et al. ..................... 408/3 |
| 4,226,312 A | * | 10/1980 | Zindler ....................... 188/259 |
| 4,413,539 A | * | 11/1983 | Ishizuka et al. ............... 29/36 |
| 4,587,871 A | * | 5/1986 | Lahm ........................... 82/120 |
| 4,819,311 A | * | 4/1989 | Hashimoto et al. ............ 29/40 |
| 4,944,198 A | * | 7/1990 | Natale et al. .................. 29/39 |
| 5,161,290 A | * | 11/1992 | Hashimoto et al. ............ 29/40 |
| 5,394,967 A | * | 3/1995 | Bigley ......................... 192/49 |
| 5,727,297 A | * | 3/1998 | Sahm et al. .................... 29/40 |
| 5,842,392 A | | 12/1998 | Pfeifer et al. ................ 82/1.11 |
| 5,960,676 A | | 10/1999 | Pfeifer et al. ................. 74/813 |
| 6,016,729 A | | 1/2000 | Pfeifer et al. ................. 82/121 |
| 2001/0039706 A1 | * | 11/2001 | Sheehan et al. ............... 29/40 |

FOREIGN PATENT DOCUMENTS

| | | |
|---|---|---|
| JP | 4030943 | 2/1992 |
| JP | 5-138410 | 6/1993 |
| JP | 5-345206 | 12/1993 |

* cited by examiner

Primary Examiner—A. L. Wellington
Assistant Examiner—Brian D. Walsh
(74) Attorney, Agent, or Firm—Finnegan, Henderson, Farabow, Garrett & Dunner, L.L.P.

(57) ABSTRACT

A turret tool rest (10) including a tool slide (20), a tool rest body (22) movable on the tool slide, a turret (26) rotatable on the tool rest body and for mounting tools (24) at angularly-indexed positions, a servomotor (30) for rotating the turret, a clutch (32) for releasably connecting the turret with the servomotor, an engaging unit (36) for releasably engaging the turret, and a power transmission device (38) for transmitting output of the servomotor to engaging unit. A drive mechanism (34) for operating the clutch includes an interlocking device (72) operative in association with the movement of the tool rest body on the tool slide so that when the engaging unit is disengaged, the clutch is engaged and the turret is rotatably indexed by the servomotor. When the clutch unit is released, the engaging unit is engaged by operation of the servomotor and the turret is secured at an indexed position on the tool rest body.

16 Claims, 13 Drawing Sheets

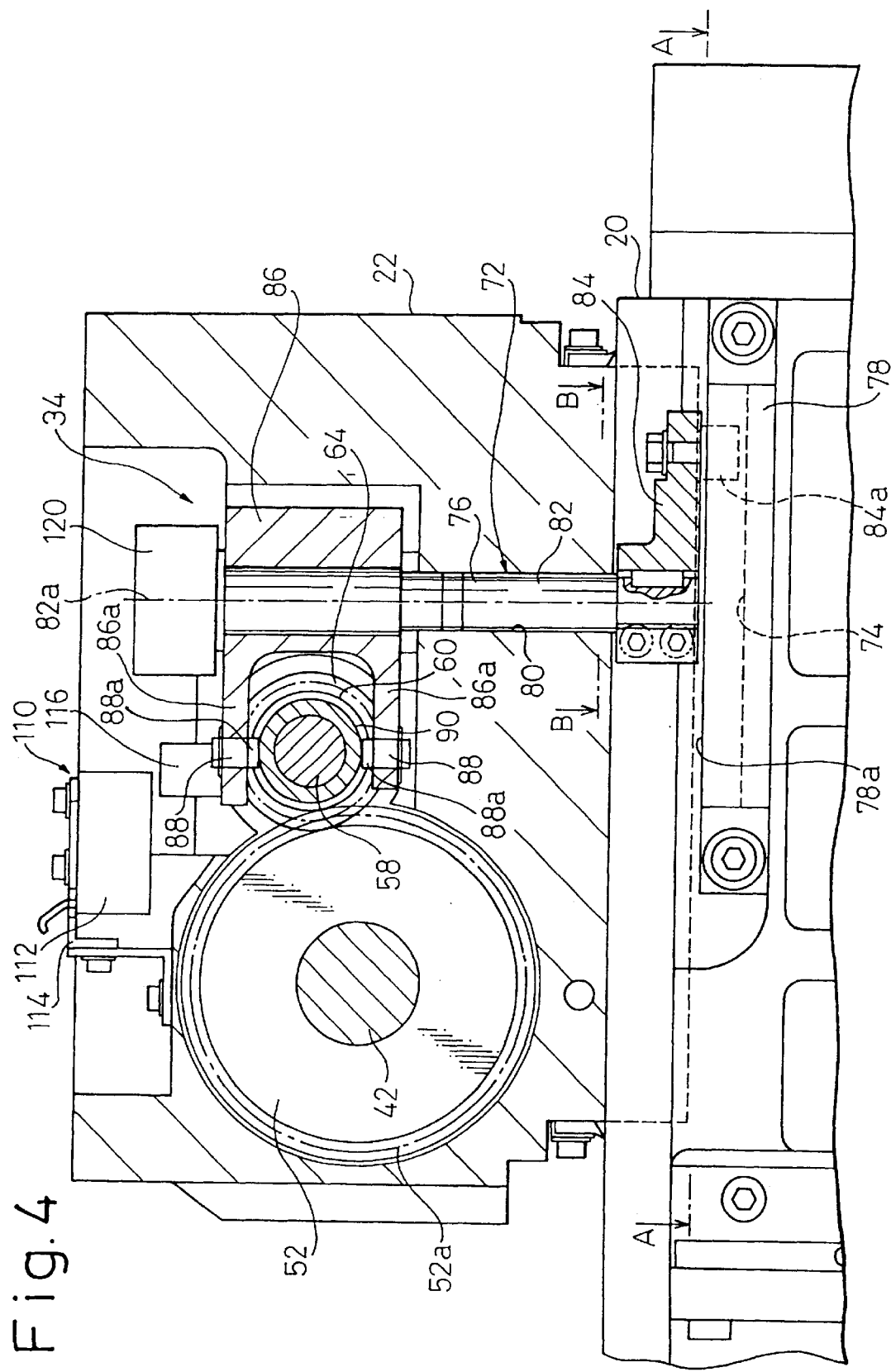

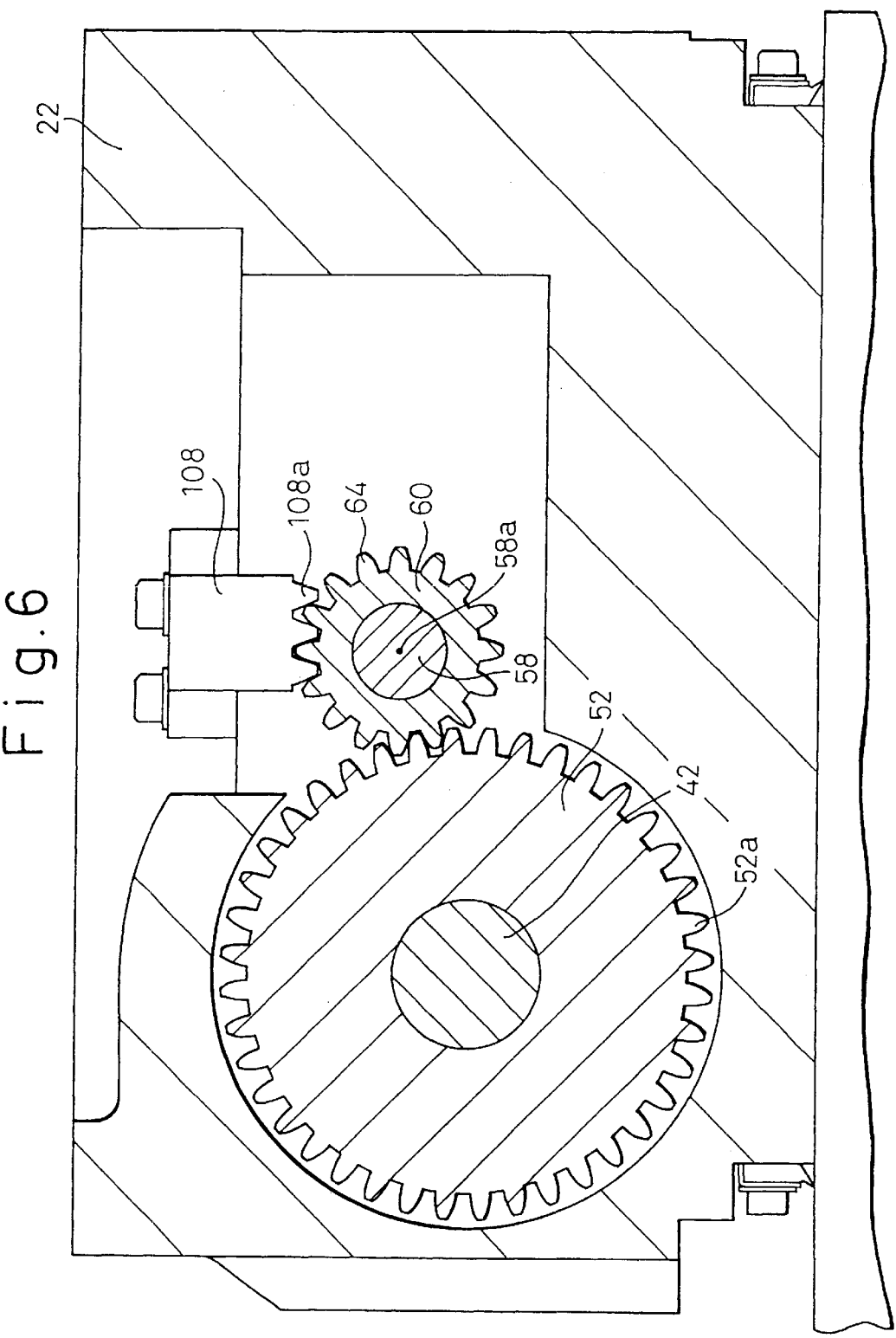

CAPSTAN REST

TECHNICAL FIELD

The present invention relates to an indexing device provided in a machine tool. More particularly, the present invention relates to a turret tool rest capable of selecting a desired tool from a plurality of tools mounted at regular circumferential intervals and locating the selected tool at a machining-work position by the indexed rotation of the turret tool rest.

BACKGROUND ART

In a field of machine tools, it is well-known that a turret tool rest capable of mounting a number of tools is used for facilitating the automation of the machining work and an increase in the machining speed, as well as for meeting a multi-item low-volume production. For example, a turret tool rest used in an automatically operated lathe is constituted by a tool slide disposed on a lathe bed at a position opposed to a rotary spindle, a tool rest body provided on the tool slide to be movable along a given coordinate axis, and a turret supported for rotation on the tool rest body and capable of respectively mounting various tools, such as cutting tools or drills, at a plurality of angularly-indexed positions around a rotation axis. In this regard, the automatically operated lathe described herein means any turning machine tools, such as NC lathes, capable of carrying out an automatic machining or turning operation.

In the turret tool rest, after the indexing rotation of the turret is performed, it is necessary to firmly secure the turret at an indexed position on the tool rest body during the machining of a workpiece with a selected tool. Accordingly, a mutually engageable and disengageable pair of engaging elements are generally disposed between the tool rest body and the turret. By mutually engaging/disengaging (or clamping/unclamping) the pair of engaging elements, it is possible to allow the indexing rotation of the turret or to locate and secure the turret at a desired indexed position.

A coupling unit in the form of an intermeshable pair of coupling members like a claw-clutch mechanism, each having a number of claws on one axial end surface, has been known as an engaging unit formed from abovementioned pair of engaging elements. In this type of engaging unit, the clamping/unclamping operation is generally performed by linearly displacing one engaging element provided for the turret in an axial direction relative to the other engaging element provided for the tool rest body by an exclusive clamp/unclamp drive mechanism.

An example of a tool selection procedure is described below. First, after a machining work on a workpiece by one tool has completed, the tool rest body is moved together with the turret on the tool slide, so as to shift a tool backward from a machining-work position to a tool-exchangeable position. Then, the turret-side engaging element is moved to be disengaged from the tool rest body-side engaging element by the clamp/unclamp drive mechanism, and, in this condition, the turret is rotated by another rotation drive source to perform an indexing rotation, so as to select a desired tool. Next, the turret-side engaging element is engaged with the tool rest body-side engaging element by the operation of the clamp/unclamp drive mechanism, so as to securely hold the selected tool at an indexed position. In this condition, the tool rest body is moved together with the turret on the tool slide, so as to feed the tool from the tool-exchangeable position to the machining-work position.

An automatically operated lathe, such as an NC lathe, includes a plurality of drive sources for respectively driving different objectives, such as a drive source for rotating a spindle, respective axial drive sources for feeding a tool, a drive source for opening/closing a spindle chuck, and so on. For these drive sources, servomotors have been generally used, particularly in portions (such as a spindle or a tool-feed) requiring a high-speed and high-precision response. In recent years, servomotors also tend to be used in portions wherein hydraulic or pneumatic actuators have been conventionally used, such as the chuck opening/closing drive source or the turret rotation drive source in the turret tool rest described above, because of the advantages of environmental sanitation and operational reliability in the servomotors.

In the above-described clamp/unclamp drive mechanism for the turret tool rest, however, electric-motorization has been delayed and hydraulic or pneumatic actuators are still used in most cases, due to, e.g., the fact that a required operation is a simple one for merely slightly displacing one of engaging elements in an axial direction. The hydraulic or pneumatic actuators generally possess problems such as the deterioration of working environment due to noise or atmospheric pollution, the rise of equipment cost, the enlargement of machine size, low precision of response, and so on. Particularly, when a hydraulic cylinder is used as the clamp/unclamp drive mechanism, the operation speed easily varies due to the change in temperature of hydraulic fluid, so that the time required for clamping/unclamping the engaging elements fluctuates, which results in difficulties in the stable control of sequential turret-indexing operations. Also, since the hydraulic cylinder itself constitutes a considerable heat source and a thermal expansion of peripheral machine components is caused which results in difficulties in obtaining a stable machining accuracy. Therefore, the electric-motorization of the clamp/unclamp drive mechanism of the turret tool rest has been also desired.

On the other hand, in the turret tool rest with an electrically motorized drive source, a servomotor as a turret rotation drive source is provided on the tool rest body, and, in the case where not only stationary tools such as a cutting tool but also rotary tools such as a drill can be mounted, another servomotor is also provided on the tool rest body for the rotary tools. Moreover, if a further servomotor is provided as a clamp/unclamp drive source on the tool rest body in response to the demand for the electric-motorization of the clamp/unclamp drive mechanism, a weight of the tool rest body, as one of moving elements along a given coordinate axis on the lathe bed, unduly increases, which may result in the lowering of response accuracy, and may cause the problems of the enlargement of entire machine dimensions, the rise of production and operating cost, and so on.

DISCLOSURE OF THE INVENTION

Accordingly, an object of the present invention is to provide a turret tool rest in which the electrical motorization of a clamp/unclamp drive mechanism capable of securely holding and releasing a turret at an indexed position on a tool rest body can be performed without incorporating an additional motor, so that several effects, such as the mitigation of noise or atmospheric pollution, the saving of energy consumption, the improvement of response accuracy, the reduction of production and operating cost, and so on, can be obtained, and that the further reduction of dimensions of a machine tool and the further improvement of performance thereof can be facilitated.

To achieve the above object, the present invention provides a turret tool rest, comprising a base; a tool rest body movably provided on the base; a turret rotatably supported on the tool rest body, the turret permitting desired tools to be individually mounted at predetermined angularly-indexed positions; an electric motor for rotationally driving the turret; a clutch unit arranged between the turret and the electric motor, the clutch unit operatively connecting the turret with the electric motor in a releasable manner; a drive mechanism for operating the clutch unit; an engaging unit arranged between the tool rest body and the turret, the engaging unit engaging the turret with the tool rest body in a disengageable manner; and a power transmission device arranged between the electric motor and the engaging unit, the power transmission device transmitting an output of the electric motor to the engaging unit so as to operate the engaging unit; wherein, when the engaging unit is in a disengaged state, the clutch unit is set in a connecting state and an indexing rotation of the turret is caused by the electric motor, and when the clutch unit is in a releasing state, the engaging unit is set in an engaged state and the turret is secured at an indexed position on the tool rest body.

According to a preferred aspect of the present invention, the drive mechanism includes an interlocking device for operating the clutch unit in association with a movement of the tool rest body on the base.

In this arrangement, it is preferred that the interlocking device includes a cam provided on the base and a follower member provided on the tool rest body to be slidably engaged at one end with the cam and operatively connected at another end with the clutch unit, the clutch unit being operated due to a rotation of the follower member generated by the movement of the tool rest body on the base.

It is also preferred that the clutch unit includes a clutch shaft coupled to an output shaft of the electric motor for rotation and a rotatable annular clutch member arranged coaxially with the clutch shaft and connected to the turret, the annular clutch member being engageable and disengageable with the clutch shaft.

Preferably, the turret includes an index gear fixedly provided and arranged coaxially with the turret, and the annular clutch member is provided on an outer periphery with a toothed portion for meshing with the index gear.

Preferably, the clutch shaft is provided on an outer periphery thereof with a meshing portion, and the annular clutch member is attached to the clutch shaft in an axially movable and rotatable manner, the annular clutch member being provided on one axial end thereof with a corresponding meshable portion for meshing with the meshing portion in a disengageable manner.

It is advantageous to further comprise a sensing unit for sensing an inadequate engagement of the clutch shaft with the annular clutch member.

It is desirable to further comprise a power absorbing mechanism for absorbing an output of the drive mechanism when the inadequate engagement of the clutch shaft with the annular clutch member is generated.

It is advantageous to further comprise a stop member for being engaged with the annular clutch member to stop a rotation of the annular clutch member when the annular clutch member is disengaged from the clutch shaft.

Preferably, the stop member is arranged to stop the rotation of the annular clutch member before the annular clutch member is completely disengaged from the clutch shaft.

It is advantageous to further comprise a sensing unit for sensing an inadequate engagement of the stop member with the annular clutch member.

It is desirable to further comprise a power absorbing mechanism for absorbing an output of the drive mechanism when the inadequate engagement of the stop member with the annular clutch member is generated.

The engaging unit may include an immovable-side engaging element provided on the tool rest body and a movable-side engaging element provided on the turret, and the power transmission device may move the movable-side engaging element between an engaged position for engagement with the immovable-side engaging element to stop a rotation of the turret and a disengaged position for disengagement from the immovable-side engaging element to permit the rotation of the turret.

The power transmission device may include a feed screw arrangement provided on the turret and a gear train for connecting an output shaft of the electric motor to a rotating element of the feed screw arrangement.

The rotating element of the feed screw arrangement may be arranged to rotate synchronously with the turret in an identical direction during the indexing rotation of the turret.

The present invention also provides an automatically operated lathe including a turret tool rest, comprising a lathe bed; a base provided on the lathe bed; a tool rest body movably provided on the base; a turret rotatably supported on the tool rest body, the turret permitting desired tools to be individually mounted at predetermined angularly-indexed positions; an electric motor for rotationally driving the turret; a clutch unit arranged between the turret and the electric motor, the clutch unit operatively connecting the turret with the electric motor in a releasable manner; a drive mechanism for operating the clutch unit in association with a movement of the tool rest body on the base; an engaging unit arranged between the tool rest body and the turret, the engaging unit engaging the turret with the tool rest body in a disengageable manner; and a power transmission device arranged between the electric motor and the engaging unit, the power transmission device transmitting an output of the electric motor to the engaging unit so as to operate the engaging unit; wherein, when the engaging unit is in a disengaged state, the clutch unit is set in a connecting state and an indexing rotation of the turret is caused by the electric motor, and when the clutch unit is in a releasing state, the engaging unit is set in an engaged state and the turret is secured at an indexed position on the tool rest body.

BRIEF DESCRIPTION OF THE DRAWINGS

The above and other objects, features and advantages of the present invention will be described with reference to the preferred embodiments illustrated in the attached drawings, wherein:

FIG. 4 is a sectional view taken along line IV—IV in FIG. 3;

FIG. 6 is a sectional view taken along line VI—VI in FIG. 3;

BEST MODES FOR CARRYING OUT THE INVENTION

Figure 1:
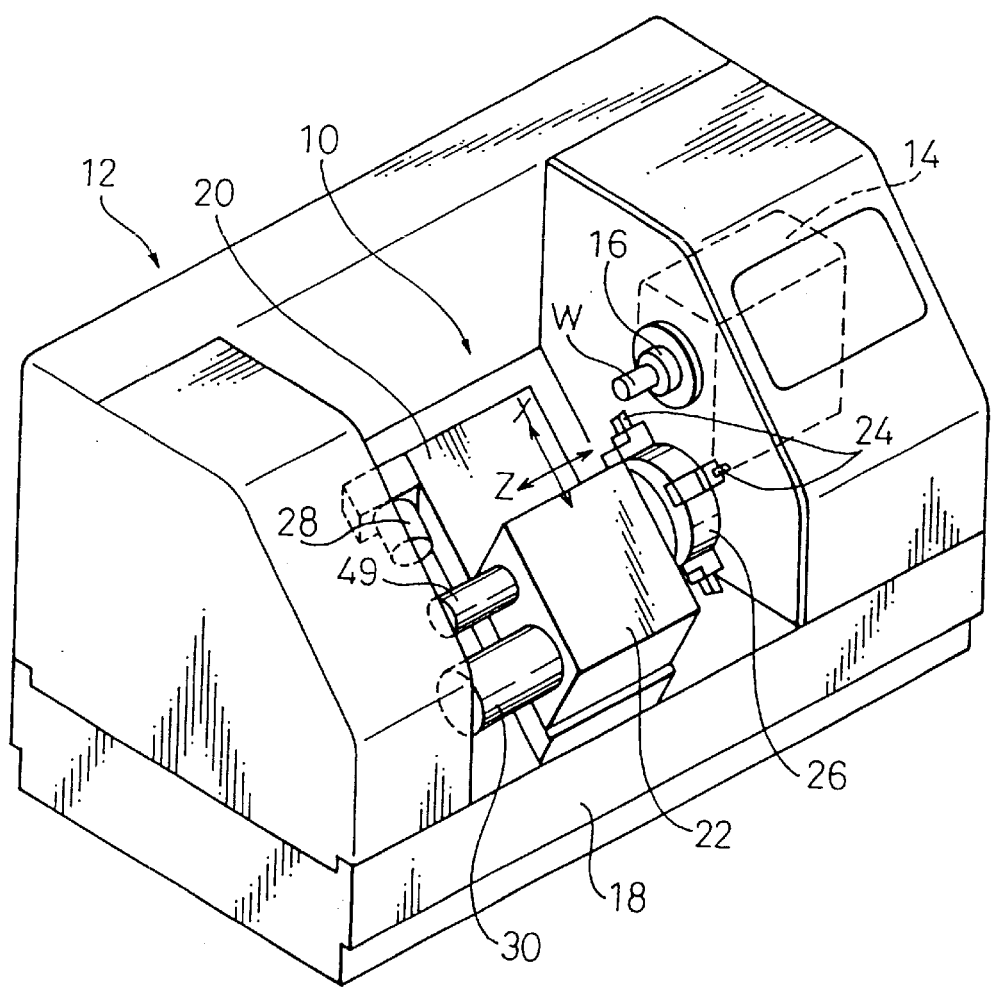
FIG. 1 is a schematic perspective view of an automatically operated lathe provided with a turret tool rest according to one embodiment of the present invention.

With reference to the drawings, FIG. 1 schematically illustrates a turret tool rest 10 according to one embodiment of the present invention, which is incorporated in an automatically operated lathe 12, such as an NC lathe. The turret tool rest 10 is disposed to be opposed to a spindle stock 14 of the automatically operated lathe 12. A rotary spindle 16 is mounted to the spindle stock 14 and is rotationally driven by a drive source, not shown, while holding a workpiece W (or a bar) to be machined. The turret tool rest 10 carries in advance a plurality of tools, required for machining the workpiece W, at predetermined angularly-indexed positions, and selects a desired tool therefrom in accordance with the process of machining the workpiece W by a rotationally indexing operation, so as to automatically locate the selected tool at a machining-work position near the front end of the rotary spindle 16. Although not shown, the automatically operated lathe 12 may have a back-side spindle for holding the workpiece w delivered from the rotary spindle 16, the back-side spindle being arranged to face oppositely to the rotary spindle 16. The turret tool rest 10 is also capable of positioning a desired tool in relation to the workpiece W held in the back-side spindle.

Figure 2:
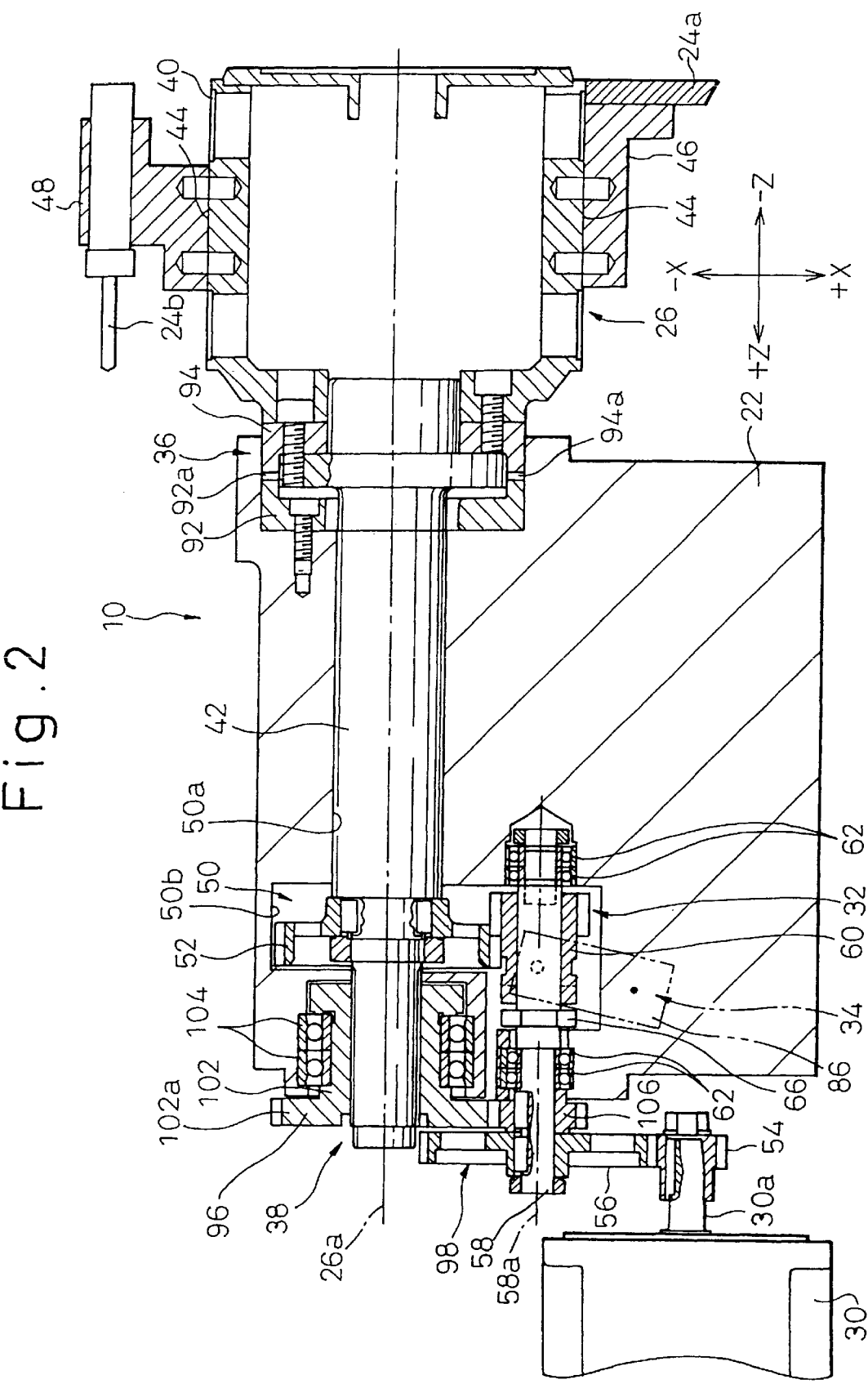
FIG. 2 is a sectional plan view of the turret tool rest in FIG. 1, showing a condition where a turret is clamped and a clutch is released.

The turret tool rest 10 includes a base or a tool slide 20 disposed on a lathe bed 18 of the automatically operated lathe at a position opposed to the rotary spindle 16, a tool rest body 22 movably provided on the tool slide 20 along a given coordinate axis, and a turret 26 rotatably supported on the tool rest body 22 and capable of individually mounting various tools 24, such as a cutter or a drill, at a plurality of angularly-indexed positions around a rotation axis 26a (FIG. 2). In the illustrated embodiment, the tool slide 20 is driven to move in a Z-axis direction parallel to the center axis of the rotary spindle 16 by a not-shown Z-axis feed motor, and the tool rest body 22 is driven to move in an X-axis direction orthogonal to the center axis of the rotary spindle 16 by an X-axis feed motor 28. The turret 26 is disposed so that the rotation axis 26a thereof is parallel to the Z-axis, and thereby various tools 24a selected on the turret 26 turns or machines the workpiece W into a desired shape in association with both axial feed motions.

As shown in FIG. 2, the turret tool rest 10 further includes a servomotor 30 for rotationally driving the turret 26, a clutch unit 32 disposed between the turret 26 and the servomotor 30, for operatively connecting the turret 26 with the servomotor 30 in a releasable manner, a drive mechanism 34 for operating the clutch unit 32, an engaging unit 36 arranged between the tool rest body 22 and the turret 26, for engaging the turret 26 with the tool rest body 22 in a disengageable manner, and a power transmission device 38 arranged between the servomotor 30 and the engaging unit 36, for transmitting the output of the servomotor 30 to the engaging unit 36 so as to operate the engaging unit 36.

As shown in FIG. 2, the turret 26 is provided with a hollow head portion 40 with a cylindrical or prismatic profile and a hollow cylindrical shaft portion 42 coaxially extending from one axial end of the head portion 40 in an axial direction. The head portion 40 of the turret 26 extends outward from a front end surface (a right end in the drawing) of the tool rest body 22, and is provided on the circumferential surface thereof with a plurality of tool mounting portions 44 for mounting the tools 24 at predetermined indexing-angular intervals. At the tool mounting portions 44, a stationary tool 24a such as a cutting tool can be fixedly mounted by using a holder 46, and a rotary tool 24b such as a drill can be rotatably mounted by using a holder 48, as illustrated.

The rotary tool 24b can be driven by an exclusive servomotor 49 (see FIG. 1) provided at a rear end (a left end in the drawing) of the tool rest body 22, via a drive shaft and a drive gear (both not shown) provided within the head portion 40 and the shaft portion 42. In the present invention, however, it is not necessary for the turret 26 to be capable of mounting the rotary tools 24b thereon, but the turret 26 may be arranged to carry the stationary tools 24a alone. In the latter case, the turret tool rest 10 will have no servomotor 49 used as a drive source for the rotary tools.

The shaft portion 42 of the turret 26 is a stepped cylindrical member having a rotation axis 26a, and is received in a turret-receiving cavity 50 formed through the tool rest body 22 in a rotatable and axially movable manner. A longitudinal front region of the shaft portion 42 is slidably supported on an inner cylindrical wall 50a defining a front part of the turret-receiving cavity 50 of the tool rest body 22, in a manner as to prevent a radial backlash. In a middle region of the shaft portion 42, an index gear 52 described later is fixed. The index gear 52 is operatively connected to the above-described clutch unit 32, and is rotatably accommodated together with the shaft portion 42 in a recess 50b defining an extended rear portion of the turret-receiving cavity 50. In a longitudinal rear region of the shaft portion 42 of the turret 42, the above-described power transmission device 38 is provided.

Figure 3:
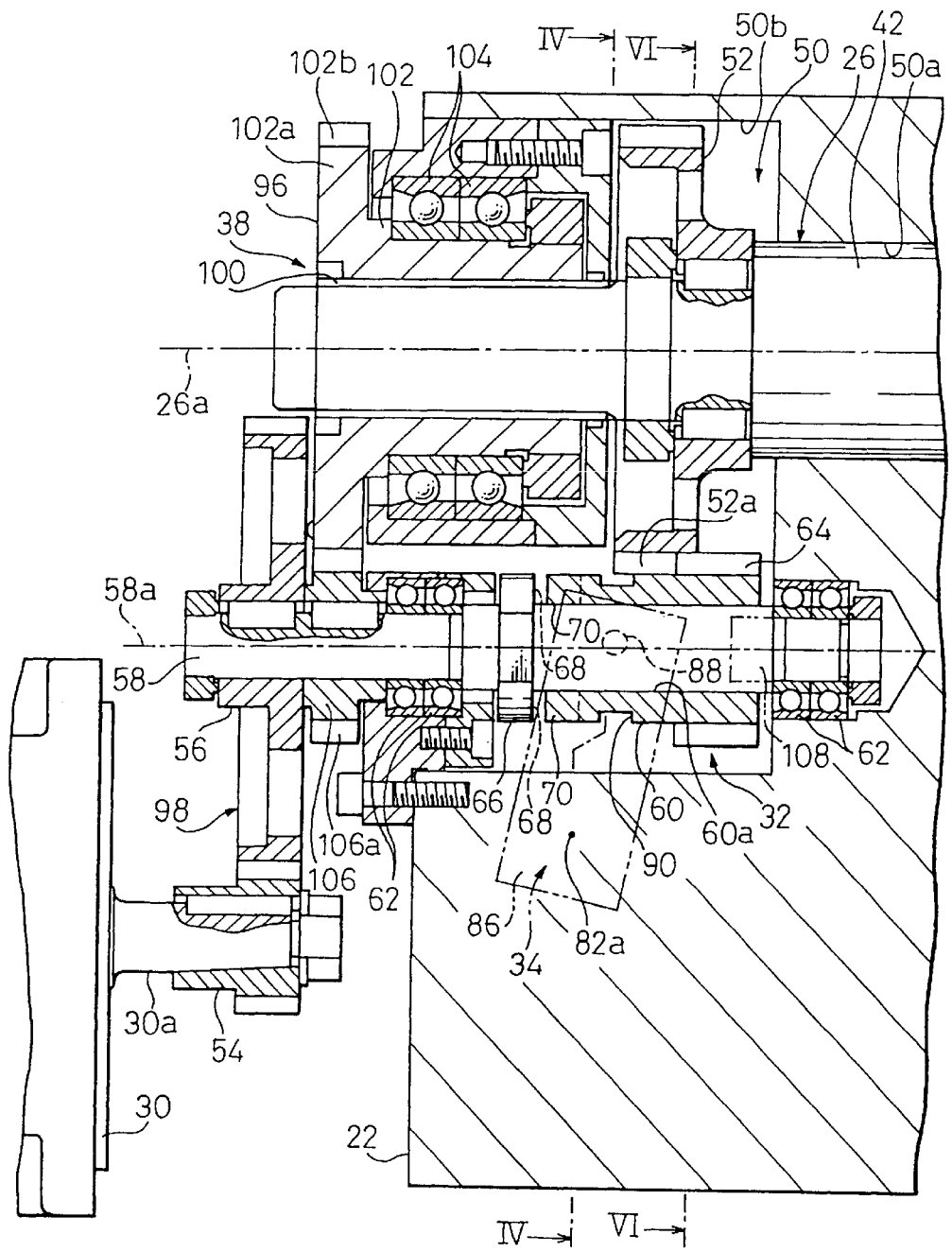
FIG. 3 is a partially-enlarged sectional plan view of the turret tool rest in FIG. 1.

The servomotor 30 for rotationally driving the turret 26 is disposed at a rear end of the tool rest body 22, and an output shaft 30a thereof is operatively connected to the clutch unit 32 through gears 54, 56. As shown in FIGS. 2 and 3, the clutch unit 32 includes a clutch shaft 58 fixedly carrying the gear 56 at a rear end thereof, and an annular clutch member 60 arranged coaxially with the clutch shaft 58 so as to be engageable and disengageable with the latter. The clutch shaft 58 is a stepped cylindrical member having a rotation axis 58a, and is rotatably supported on the tool rest body 22 through two sets of bearings 62. The clutch shaft 58 is accommodated in the recess 50b of the turret-receiving cavity 50 while the axis 58a thereof is disposed generally in parallel to the axis 26a of the, turret 26.

The annular clutch member 60 of the clutch unit 32 is a hollow cylindrical member, and is slidably attached at an inner peripheral face 60a thereof to a longitudinal front region of the clutch shaft 58 with a larger diameter. The annular clutch member 60 is supported on the clutch shaft 58 so as to be axially movable and rotatable about the axis 58a of the clutch shaft 58. In the axially front region of the outer peripheral face of the annular clutch member 60, a toothed portion 64 is integrally provided and meshes with a toothed portion 52a of the index gear 52 fixed to the shaft portion 42 of the turret 26. The toothed portion 64 of the annular clutch member 60 has a plurality of teeth extending parallel to the axis 58a of the clutch shaft 58, and is always meshed with the toothed portion 52a of the index gear 52, within the axial movable range of the annular clutch member 60 on the clutch shaft 58.

The clutch shaft 58 is provided with an annular flange 66 extending outward at a generally axial middle portion of the outer peripheral surface thereof. Slots 68 (see FIG. 9B) are formed at predetermined circumferential positions on the flange 66 (at two positions defined at respective 180 degrees central angles, in the illustrated embodiment), so as to radially outwardly open and axially penetrate therethrough. On the other hand, pawls 70, each having dimensions corresponding to those of each slot 68, are formed at predetermined circumferential positions on an axial rear end surface of the annular clutch member 60 (at two positions defined at respective 180 degrees central angles, in the illustrated embodiment), so as to project in the axial direction. Two pawls 70 of the annular clutch member 60 can respectively be received in and separated from two slots 68 of the flange 66 of the clutch shaft 58, in accordance with the axial movement of the annular clutch member 60 along the clutch shaft 58.

The servomotor 30 imparts a torque to the turret 26 through the gears 54, 56, the clutch shaft 58, the annular clutch member 60 and the index gear 52, during the period when two pawls 70 of the annular member 60 are respectively received in two slots 68 of the flange 66 of the clutch shaft 58 and thereby the clutch shaft 58 is coupled to the annular clutch member 60. Thus, in the turret tool rest 10, the turret 26 is driven by the servomotor 30 to perform the indexing rotation, so as to select a desired tool 24 mounted at a desired tool mounting portion 44.

The clutch unit 32 may have another structure wherein pawls are provided on the outer peripheral surface of the clutch shaft 58 and slots with corresponding dimensions are formed on an axial rear end surface of the annular clutch member 60, or a well-known claw clutch structure including male and female members with identical shapes, in place of the above-mentioned structure.

Figure 5A:
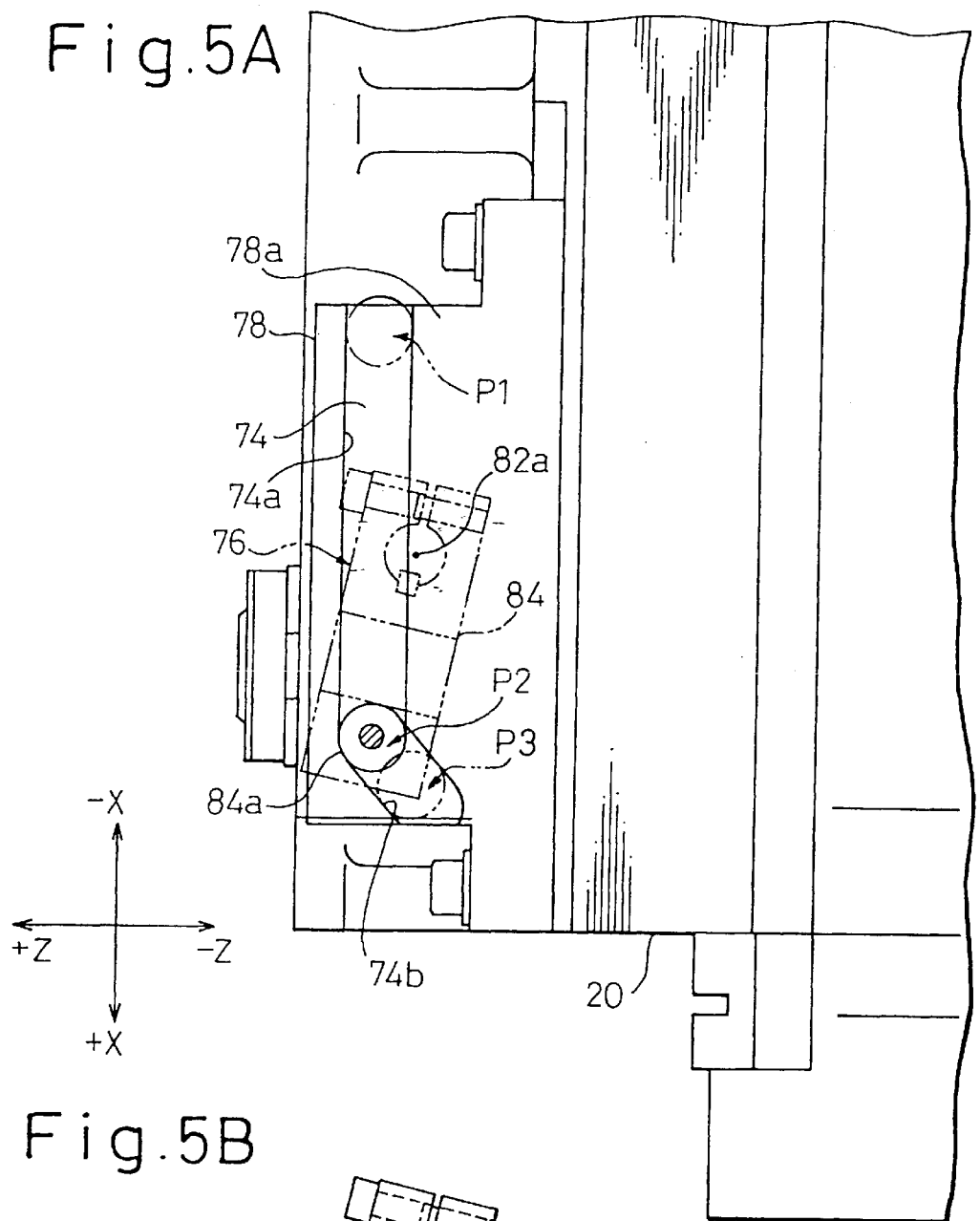
FIG. 5A is a sectional view taken along line A—A in FIG. 4.

The above-described drive mechanism 34 includes an interlocking device 72 for operating the clutch unit 32 in association with the movement of the tool rest body 22 in the X-axis direction on the tool slide 20. As shown in FIGS. 4 and 5A, the interlocking device 72 includes a cam 74 provided on the tool slide 20, and a follower member 76 provided on the tool rest body 22 to be slidably engaged at one end with the cam 74 and operatively connected at the other end with the clutch unit 32. In the illustrated embodiment, the cam 74 is constituted as a cam groove 74 recessed in an upper end surface 78a of an additional base 78 securely arranged close to the tool slide 20 side by side. The cam groove 74 includes a first groove portion 74a extending linearly in the X-axis direction in a coordinates system on the lathe bed 18, and a second groove portion 74b joined to one end of the first groove portion 74a and intersecting therewith at an obtuse angle.

Figure 5B:
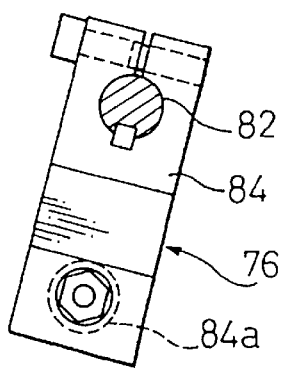
FIG. 5B is a sectional view taken-along line B—B in FIG. 4.

The follower member 76 of the interlocking device 72 includes a joint shaft 82 rotatably received in a bearing hole 80 bored through the tool rest body 22, a first lever 84 (FIG. 5B) having at a distal end thereof a protrusion 84a arranged to be slidably received in the cam groove 74, and a second lever 86 fixed to near another end of the joint shaft 82 and connected to the annular clutch member 60 of the clutch unit 32. The joint shaft 82 of the follower member 76 has a center axis 82a extending in a direction generally orthogonal to the X-and Z-axes in the coordinates system on the lathe bed 18. Accordingly, the follower member 76 is supported on the tool rest body 22 in a manner that the joint shaft 82, the first lever 84 and the second lever 86 are integrally rotatable about the center axis 82a.

The protrusion 84a of the first lever 84 of the follower member 76 has a generally cylindrical shape and dimensions permitting it to be received in the cam groove 74 without any backlash and to smoothly slide along the cam groove 74.

The second lever 86 of the follower member 76 includes a pair of extensions 86a extending generally orthogonal to the joint shaft 82. The annular clutch member 60 of the clutch unit 32 is arranged between the extensions 86a in a mutually non-contacting manner. In a distal end region of each extension 86a, a pin 88 provided integrally at an end thereof with a generally rectangular-parallelepiped slide piece 88a is rotatably mounted, in such a manner that the slide pieces 88a of both pins are opposed to each other. On the other hand, the annular clutch member 60 is provided with an annular groove 90 continuously extending in a circumferential direction in an axial rear region of the outer circumferential surface thereof. The annular groove 90 slidably receives the slide pieces 88a of the pair of pins 88 provided in the second lever 86.

In this manner, the annular clutch member 60 is operatively connected to the second lever 86 and thus the follower member 76, through the annular groove 90 and the slide pieces 88a of the pair of pins 88. Under this connecting structure, the annular clutch member 60 is freely rotatable between the pair of extensions 86a of the second lever 86, while the second lever 86 and thus the follower member 76 is rotatable about the center axis 82a of the joint shaft 82 within a predetermined angular range.

In the above arrangement, when the tool rest body 22 moves in the X-axis direction on the tool slide 20, the follower member 76 moves in the X-axis direction together with the tool rest body 22, which causes the first lever 84 to move along the cam groove 74 through the protrusion 84a. When the protrusion 84a of the first lever 84 is transferred between the first groove portion 74a and the second groove portion 74b in the cam groove 74, the moving direction of the protrusion 84a changes so as to pivot the first lever 84 about the joint shaft 82, whereby the joint shaft 82 and the second lever 86 rotate about the center axis 82a. Thereby, the pair of pins 88 of the second lever 86 are pivoted about the center axis 82a, and the annular clutch member 60 moves in the axial direction on the clutch shaft 58 under the interengagement of both pins 88 with the annular groove 90. In this manner, the clutch unit 32 performs a connecting/releasing operation as described above. As a result, the turret 26 is operatively connected to the servomotor 30 or is disconnected therefrom.

With reference again to FIG. 2, the engaging unit 36 of the turret tool rest 10 is provided with an immovable-side engaging element 92 fixed to the tool rest body 22 and a movable-side engaging element 94 fixed to the turret 26. The immovable-side engaging element 92 is an annular element generally having a claw-clutch structure, and is fixedly disposed at an axial front open-end of the turret-receiving cavity 50 in the tool rest body 22 so as to coaxially encircle the shaft portion 42 of the turret 26 in a non-contacting manner. The movable-side engaging element 94 is an annular element having a similar claw-clutch structure, and is disposed at a joint position of the head portion 40 with the shaft portion 42 of the turret 26 so as to be movable together with the turret 26 while coaxially encircling the shaft portion 42.

On the axial front end surface of the immovable-side engaging element 92 (a right end surface in the drawing), a plurality of claws 92a are radially provided at predetermined pitches, while on the axial rear end surface of the movable-side engaging element 94 (a left end surface in the drawing), a plurality of claws 94a meshable with the claws 92a are radially provided at predetermined pitches. The immovable-side engaging element 92 and the movable-side engaging element 94 are arranged so that the claws 92a, 94a thereof axially face to each other in an engageable and disengageable manner. When the movable-side engaging element 94 axially moves together with the turret 26 in the condition where the turret 26 is not rotated, the immovable-side engaging element 92 can be engaged with and disengaged from the movable-side engaging element 94.

In the state shown in FIG. 2, the claws 92a of the immovable-side engaging element 92 is engaged with the claws 92a of the movable-side engaging element 94. As a result, the rotation of the movable-side engaging element 94 is inhibited relative to the immovable-side engaging element 92, and the turret 26 is thus prevented from rotating relative to the tool rest body 22. In this condition, the movable-side engaging element 94 is located at an engaging (or clamp) position, together with the turret 26, which is the rearmost position within the range of axial movement of the movable-side engaging element.

A desired tool 24 mounted to the head portion 40 of the turret 26 performs the machining of the workpiece W held by the spindle 16, during the period when the turret 26 and the movable-side engaging element 94 are located at the above-described engaging position (see FIG. 1). In the meantime, the turret 26 is securely and firmly held on the tool rest body 22 with a force sufficient to resist a stress applied to the tool 24 during the machining work and to maintain machining accuracy.

As the turret 26 and the movable-side engaging element 94 moves forward (rightward in the drawing) from the engaging position as illustrated, the claws 94a of the movable-side engaging element 94 begin to disengage from the claws 92a of the immovable-side engaging element 92. When the claws 92a, 94a of the engaging elements 92, 94 have been completely disengaged from each other and the turret 26 and the movable-side engaging element 94 are located at a disengaging (or unclamped) position foremost within the range of axial movement thereof, the movable-side engaging element 94 is allowed to freely rotate relative to the immovable-side engaging element 92. As a result, the turret 26 is released from a state fixed to the tool rest body 22, whereby the turret 26 is put into a condition where it can be driven for the indexing rotation by the servomotor 30 through the clutch unit 32 as described.

During the period that the turret 26 and the movable-side engaging element 94 move between the engaging and disengaging positions, the index gear 52 fixed to the shaft portion 42 is continuously meshed with the toothed portion 64 of the annular clutch member 60 irrespective of the axial position of the annular clutch member 60 of the clutch unit 32, that is, regardless of the clutch connecting/releasing state.

The clamp/unclamp operation of the engaging unit 36, i.e., the axial movement of the turret 26 and the movable-side engaging element 94, is performed by the operation of the servomotor 30 through the power transmission device 38 as described. The power transmission device 38 is constituted by a ball screw assembly 96 used as a feed screw arrangement provided in the turret 26, and a gear train 98 for connecting the output shaft 30a of the servomotor 30 with a rotating-side element of the ball screw assembly 96.

The ball screw assembly 96 of the power transmission device 38 includes a male screw 100 provided on the outer peripheral surface of the axial rear end region of the shaft portion 42 of the turret 26, and a ball nut member 102 mounted to the shaft portion 42 and provided on the inner peripheral surface thereof with a female thread engageable with the male screw 100. The ball nut member 102 is supported in a rotatable but axially immovable manner on the tool rest body 22 through a pair of bearings 104, at an axial rear open-end of the turret-receiving cavity 50 of the tool rest body 22.

The ball nut member 102 is a rotating-side element of the ball screw assembly 96 and is provided at an axial rear end thereof with a radially extended flange 102a having a toothed portion 102b on the outer peripheral edge. The gear train 98 is constituted by the above-described gears 54, 56 fixed respectively to the output shaft 30a of the servomotor 30 and the clutch shaft 58, as well as a gear 106 fixed to the clutch shaft 58 at a position adjacent to the gear 56. The gear 106 meshes on a toothed portion 106a thereof with the toothed portion 102b provided on the flange 102a of the ball nut member 102, so as to transmit a torque to the ball nut member 102.

The ball nut member 102 of the ball screw assembly 96 is driven by a servomotor 82 via the gear train 98 to rotate in the turret-receiving cavity 50. Since the ball nut member 102 is immovable in the axial direction, the turret 26 moves in the turret-receiving cavity 50 in the axial direction due to the screw-engagement of the male screw 100 of the shaft portion 42 with the female thread of the ball nut member 102. As a result, the clamping/unclamping operation of the engaging unit 36 as described, that is, the movement of the movable-side engaging element 94 relative to the immovable-side engaging element 92 between the engaging position and the disengaging position, is realized.

According to the above arrangement of the power transmission device 38, the ball nut member 102 of the ball screw assembly 96 is always operatively connected to the servomotor 82 via the gear train 98. Thus, when the clutch unit 32 is in the connecting state and the index gear 52 of the turret 26 is operatively connected to the servomotor 30 via the clutch unit 32, the ball nut member 102 rotates, due to the operation of the servomotor 30, simultaneously with the indexing rotation of the turret 26. In this respect, since the gear 106 of the gear train 98 and the annular clutch member 60 of the clutch unit 32 are integrally connected to the common clutch shaft 58, the ball nut member 102 rotates synchronously with the turret 26 in the same direction, provided that a teeth-number ratio between the toothed portion 102b of the ball nut member 102 and the toothed portion 106a of the gear 106 is set to be equal to a teeth-number ratio between the toothed portion 52a of the index gear 52 and the toothed portion 64 of the annular clutch member 60. As a result, the inconvenience, wherein the relative rotation occurs between the turret 26 and the ball nut member 102 during the indexing rotation of the turret 26 and thereby the turret 26 moves in the axial direction, is surely avoided.

Also, according to the above-described arrangement of the power transmission device 38, when the clutch unit 32 is released and thereby the annular clutch member 60 is put into condition for free rotation during the disengaged (or unclamp) state of the engaging unit 36, the turret 26 may freely rotate while accompanying with the axial movement thereof due to the function of the ball screw assembly 96. Accordingly, the turret 26 may cause unnecessary rotation during the disengaging operation of the engaging unit 36 due to, e.g., the deviation of a center of gravity of the head portion 40 of the turret 26, so that difficulties may arise in an accurate indexing operation and that the immovable-side engaging element 92 may collide with the movable-side engaging element 94 in the engaging unit 36 to cause the breakage thereof. To solve these problems, the turret tool rest 10 is further provided with a stop member 108 to be engaged with the annular clutch member 60 of the clutch unit 32 to prevent the annular clutch member 60 from freely rotating when the annular clutch member 60 is released from the clutch shaft 58.

AS shown in FIGS. 3 and 6, the stop member 108 is constituted by a rack fixed on the tool rest body 22 at a position above the clutch shaft 58 of the clutch unit 32. The stop member 108 is provided on a side facing opposite to the clutch shaft 58 with a plurality (three in the drawing) of teeth 108a extending parallel to the axis 58a of the clutch shaft 58. These teeth 108a have such dimensions as to be meshable with the teeth of the toothed portion 64 of the annular clutch member 60 in the clutch unit 32. In a condition shown in FIGS. 3 and 6, the clutch unit 32 is put in a released state and the annular clutch member 60 is located at an axial forward position on the clutch shaft 58. In this state, some upper teeth of the toothed portion 64 of the annular clutch member 60 are meshed with the teeth 108a of the stop member 108, whereby the rotation of the annular clutch member 60 is prevented or stopped.

To substantially completely eliminate the unnecessary rotation of the turret 26 during the disengaged state of the engaging unit 36, the stop member 108 is arranged to stop the rotation of the annular clutch member 60 of the clutch unit 32 before the annular clutch member 60 is completely disengaged from the clutch shaft 58. The operative positional relationship between the clutch unit 32 and the stop member 108 will be described with reference to FIGS. 7A to 9B.

Figure 7A:
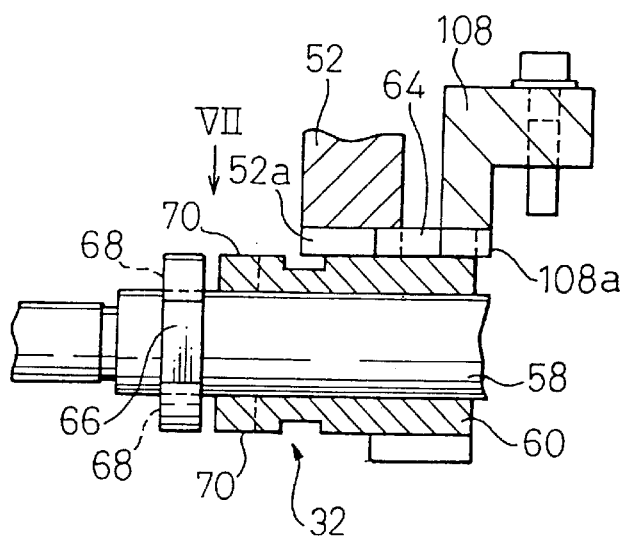
FIG. 7A is an illustration for describing the operation of a clutch unit of the turret tool rest in FIG. 1.
Figure 7B:
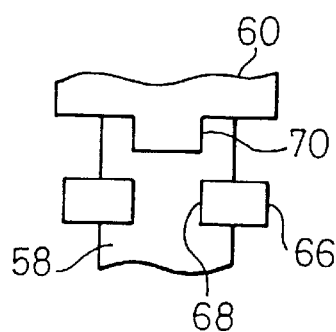
FIG. 7B is a partial plan view as seen in the direction of an arrow VII in FIG. 7A.

As shown in FIGS. 7A and 7B, when the annular clutch member 60 of the clutch unit 32 is completely disengaged from the clutch shaft 58 and each pawl 70 of the annular clutch member 60 are thus located outside of each slot 68 of the clutch shaft 58, the toothed portion 64 of the annular clutch member 60 is meshed with the teeth 108a of the stop member 108. In this condition, the toothed portion 64 of the annular clutch member 60 is also meshed with the toothed portion 52a of the index gear 52 in the turret 26. Therefore, during this condition, even if the engaging unit 36 is put in the disengaged state, the stop member 108 inhibits the rotation of the annular clutch member 60 and also prevents the free rotation of the turret 26.

Figure 8A:
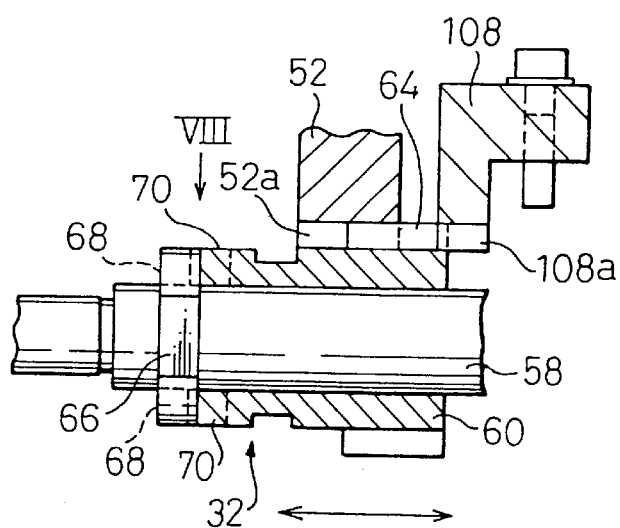
FIG. 8A is an illustration for describing the operation of the clutch unit of the turret tool rest in FIG. 1.
Figure 8B:
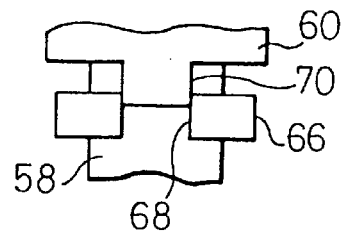
FIG. 8B is a partial plan view as seen in the direction of an arrow VIII in FIG. 8A.

When the annular clutch member 60 moves axially rearward on the clutch shaft 58 from the above condition, each pawl 70 of the annular clutch member 60 is fitted into each slot 68 of the clutch shaft 58 before the toothed portion 64 of the annular clutch member 60 is completely disengaged from the toothed portion 108a of the stop member 108 as shown in FIGS. 8A and 8B. Also in this condition, the annular clutch member 60 and the turret 26 are prevented from rotating due to the stop member 108. In this regard, to substantially eliminate a gap between the slot 68 and the pawl 70, the opposed side walls of each slot 68 and the opposite side walls of each pawl 70 extend generally parallel to the axis 58a of the clutch shaft 58.

Figure 9A:
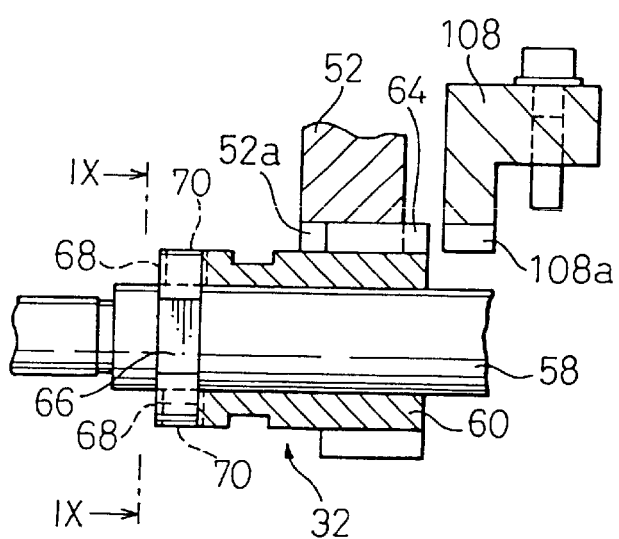
FIG. 9A is an illustration for describing the operation of the clutch unit of the turret tool rest in FIG. 1.
Figure 9B:
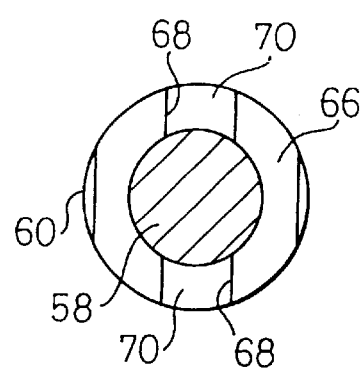
FIG. 9B is a sectional view taken along line IX—IX in FIG. 9A.

When the annular clutch member 60 moves further axially rearward on the clutch shaft 58 so as to complete the interconnection of the clutch unit 32, the toothed portion 64 of the annular clutch member 60 is completely disengaged from the teeth 108a of the stop member 108 as shown in FIGS. 9A and 9B. In this condition, the clutch unit 32 is able to transmit the output from the servomotor 30 to the index gear 52. Accordingly, during this condition, if the engaging unit 36 is put in the disengaged state, the turret 26 is driven by the servomotor 30 to cause the indexing rotation.

After the indexing rotation, when the clutch unit 32 is to be released so as to put the engaging unit 36 into the engaged state by the operation of the servomotor 30, the clutch unit 32 returns from the condition shown in FIG. 9A to the condition shown in FIG. 7A via the condition shown in FIG. 8A. That is, before the annular clutch member 60 of the clutch unit 32 is completely disengaged from the clutch shaft 58, the teeth 108a of the stop member 108 are meshed with the toothed portion 64 of the annular clutch member 60, so as to inhibit the rotation of the annular clutch member 60. Accordingly, even though the engaging unit 36 is put in the disengaged state, the free rotation of the turret 26 is securely inhibited.

The steps of the operation of the turret tool rest 10, having the above structure, in the automatically operated lathe 12 will be described below.

First, in a condition shown in FIG. 2, since the clutch unit 32 is in the released state and the engaging unit 36 is in the engaged state, a desired tool 24 mounted onto the head portion 40 of the turret 26 can perform the machining work on the workpiece W held by the rotary spindle 16 as described (FIG. 1). In this condition, the tool 24 is located at the machining-work position by the movement of the tool rest body 22 in a minus X direction on the tool slide 20. Also, the interlocking device 72 of the clutch drive mechanism 34 provided on the tool rest body 22 is arranged so that the protrusion 84a of the first lever 84 of the follower member 76 is located at a distal end position P1 in the first groove portion 74a of the cam groove 74 as seen in the minus X direction, as shown in FIG. 5A.

Then, when it is necessary to space the turret 26 away from the workpiece W after the machining work with the tool 24 is completed (for example, when a tool is exchanged by the turret 26, when a tool prepared in a place other than the turret 26 is used, or when the workpiece W is replaced), the tool rest body 22 moves backward on the tool slide 20 in a plus x direction. At the same time, the interlocking device 72 of the clutch drive mechanism 34 acts to move the protrusion 84a of the first lever 84 of the follower member 76 along the first groove portion 74a of the cam groove 74 in the plus X direction. During the period when the protrusion 84a of the first lever 84 moves from the position P1 to a distal end position P2 (FIG. 5A) in the first groove portion 74a of the cam groove 74 as seen in the plus X direction (that is, a boundary between the first groove portion 74a and the second groove portion 74b), the follower member 76 does not rotate and thus the clutch unit 32 is maintained in a released state.

In this manner, during the movement of the protrusion 84a of the first lever 84 of the follower member 76 from P1 to P2 along the first groove portion 74a of the cam groove 74, the tool 24 on the turret 26 is located at a desired backward position between the machining-work position and a first backward position. In this state, it is possible to use a tool (not shown) prepared in a place other than the turret 26 or to replace a workpiece W.

Figure 10:
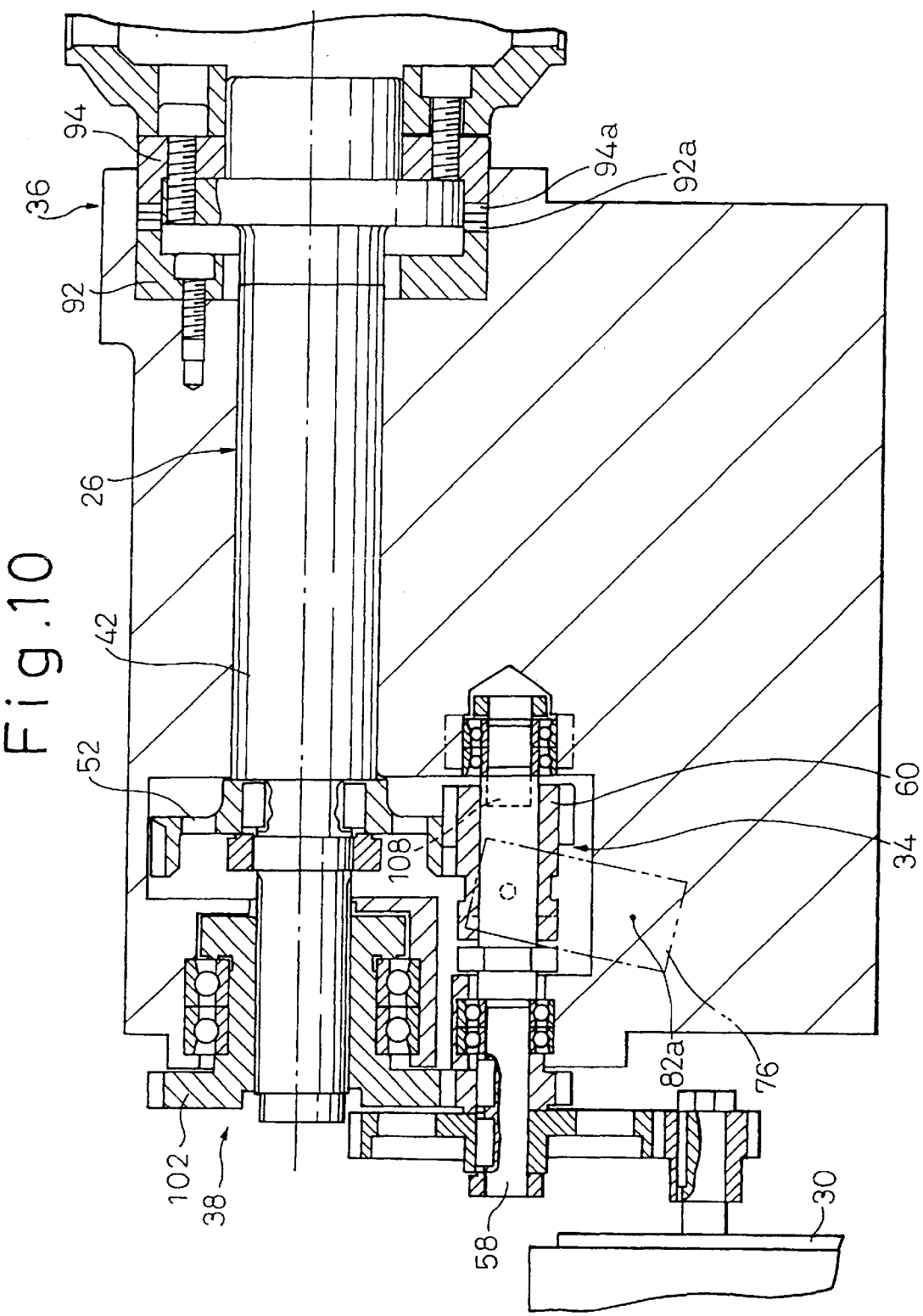
FIG. 10 is a sectional plan view of the turret tool rest in FIG. 1, showing a condition where a turret is unclamped and a clutch is released.

Further, when a tool exchanging operation by the indexing rotation of the turret 26 should be performed, the turret 26 is moved axially forward by the operation of the servomotor 30 through the power transmission device 38 so as to put the engaging unit 36 in the disengaged state (see FIG. 10), at a desired timing during the period when the protrusion 84a of the first lever 84 of the follower member 76 moves from P1 to P2 along the first groove portion 74a of the cam groove 74, i.e., the period when the tool 24 on the turret 26 moves from the machining-work position to the first backward position. During this condition, since the annular clutch member 60 of the clutch unit 32 is engaged with the stop member 108 as described, the free rotation of the turret 26 is inhibited.

Subsequently, when the tool rest body 22 moves further backward on the tool slide 20 in the plus X direction, the interlocking device 72 of the clutch drive mechanism 34 acts to shift the protrusion 84a of the first lever 84 of the follower member 76 from the first groove portion 74a to the second groove portion 74b of the cam groove 74. During the period when the protrusion 84a of the first lever 84 moves from P2 to a distal end position P3 (FIG. 5A) in the second groove portion 74a of the cam groove 74 as seen in the plus X direction, the follower member 76 rotates counterclockwise about the axis 82a as seen in FIG. 5A, whereby the clutch unit 32 operates to transfer from the releasing state to the connecting state as described.

Figure 11:
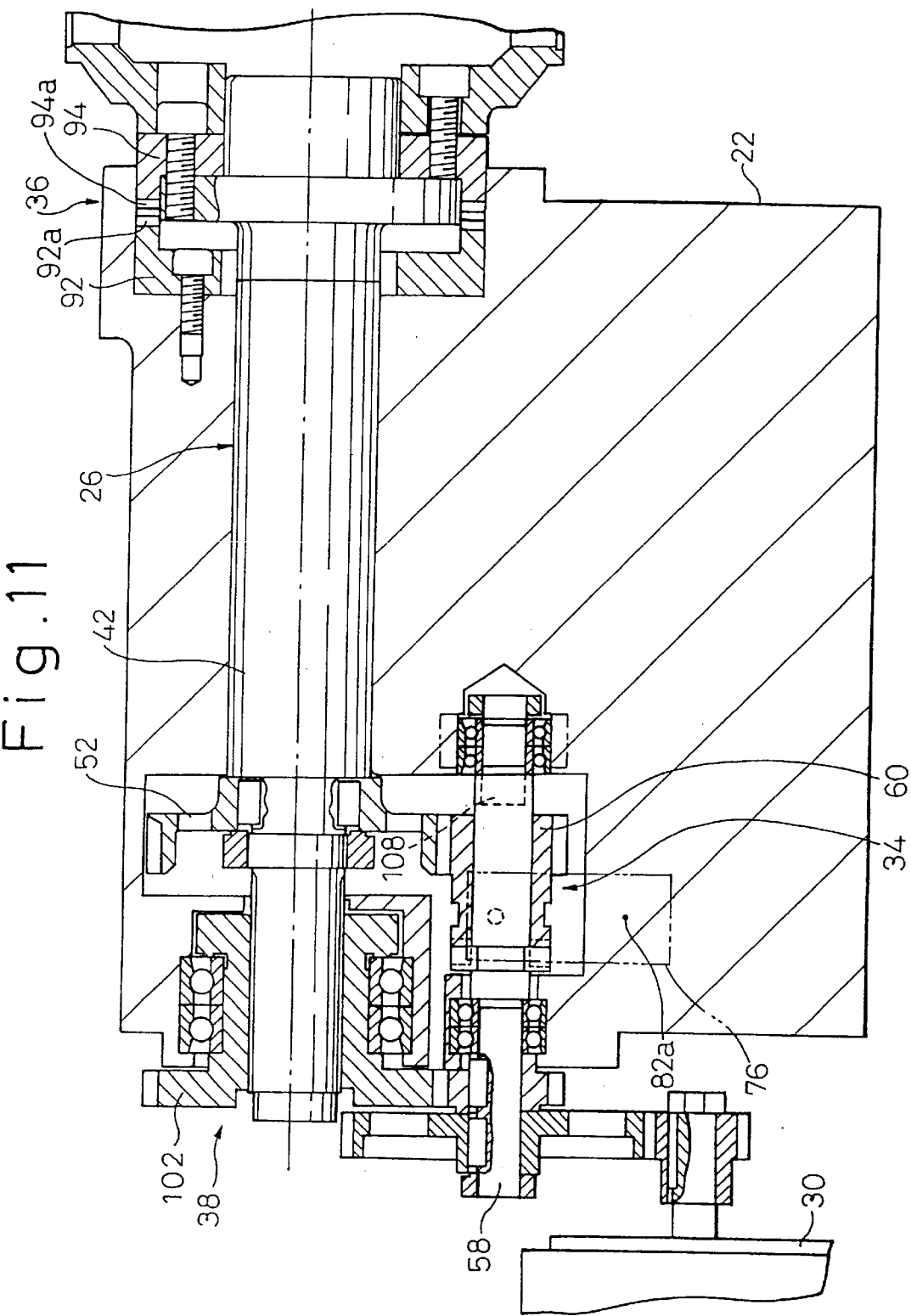
FIG. 11 is a sectional plan view of the turret tool rest in FIG. 1, showing a condition where a turret is unclamped and a clutch is coupled.

When the protrusion 84a of the first lever 84 of the follower member 76 reaches P3, the clutch unit 32 completes a connecting operation, so that the annular clutch member 60 is disengaged from the stop member 108 (see FIG. 11). In this state, the tool 24 on the turret 26 is located at a second backward position or a tool exchange position, at which the servomotor 30 drives the turret 26 to cause the indexing rotation.

When a desired next tool 24 is selected by the indexing rotation of the turret 26, the tool rest body 22 moves on the tool slide 20 in the minus X direction. Simultaneously therewith, the clutch drive mechanism 34 acts to move the protrusion 84a of the first lever 84 of the follower member 76 from P3 to P2 along the second groove portion 74b of the cam groove 74, and in the meanwhile, the follower member 76 rotates clockwise about the axis 82a as seen in FIG. 5A. Thereby, the clutch unit 32 operates to transfer from the connecting state to the releasing state as described. During this condition, since the annular clutch member 60 of the clutch unit 32 is engaged with the stop member 108 as described, the free rotation of the turret 26 is inhibited, and the selected tool 24 is held at a desired indexed position.

Thereafter, the tool rest body 22 moves further on the tool slide 20 in the minus X direction. Then, at a desired timing during the period that the protrusion 84a of the first lever 84 of the follower member 76 moves from P2 to P1 along the first groove portion 74a of the cam groove 74, the turret 26 is moved axially backward by the reverse rotation of the servomotor 30 through the power transmission device 38, so as to put the engaging unit 36 in the engaged state (FIG. 2). In this state, the next tool 24 is located in the machining-work position, so as to machine the workpiece W.

In the above arrangement of the turret tool rest 10, it is important to smoothly perform the transfer of the clutch unit 32 from the releasing state to the connecting state, i.e., the engagement of the clutch shaft 58 with the annular clutch member 60, as well as the transfer of the clutch unit 32 from the connecting state to the releasing state, i.e., the engagement of the annular clutch member 60 with the stop member 108. In this respect, the clutch shaft 58 and the annular clutch member 60 is constituted in such a mutual relationship that, during the period that these components transfer from the connecting state to the releasing state and again to the connecting state, the annular clutch member 60 does not rotate and the clutch shaft 58 generally rotates by only the same angles in the normal and the reverse directions for establishing the clamp/unclamp operation of the engaging unit 36. Therefore, the engagement of the clutch shaft 58 with the annular clutch member 60 can be smoothly performed.

On the other hand, in a relationship between the annular clutch member 60 and the stop member 108, a teeth number ratio between the toothed portion 64 of the annular clutch member 60 and the toothed portion 52a of the index gear 52 is determined so that, after the turret 26 rotates by a desired indexing angle, the toothed portion 64 of the annular clutch member 60 is certainly located at a position where the toothed portion 64 of the annular clutch member 60 is meshable with the toothed portion 108a of the stop member 108. Thereby, the smooth engagement of the annular clutch member 60 with the stop member 108 can be ensured. As shown in, e.g., FIG. 6, in the case where a minimum index angle of the turret 26 is 18 degrees (i.e., one twentieth of a circle) and thus the index gear 52 with 40 numbers teeth is used, the turret 26 performs an index rotation at each angle corresponding to two teeth of the index gear 52. In this respect, provided that the toothed portion 64 of the annular clutch member 60 has sixteen teeth, the minimum index angle of the annular clutch member 60 is 45 degrees, and therefore, every tooth of the toothed portion 64 is certainly located at a position where it is meshable with the toothed portion 108a of the stop member 108, in every rotation angle corresponding to a center angle of 45 degrees.

Even in the above arrangement, there may be a case wherein the engagements between the clutch shaft 58 and the annular clutch member 60 and between the annular clutch member 60 and the stop member 108 is not smoothly performed due to, e.g., a slight error in the rotation angle. If such an inadequate engagement occurs in the clutch unit 32, there might be a trouble in the indexing rotation as well as a risk of breakage in components constituting the clutch unit, such as the clutch shaft 58, the annular clutch member 60, the a stop member 108, and so on. Accordingly, a sensing unit 110 is preferably provided in the turret tool rest 10, for sensing an inadequate engagement between the clutch shaft 58 and the annular clutch member 60 and between the annular clutch member 60 and the stop member 108.

Figure 12:
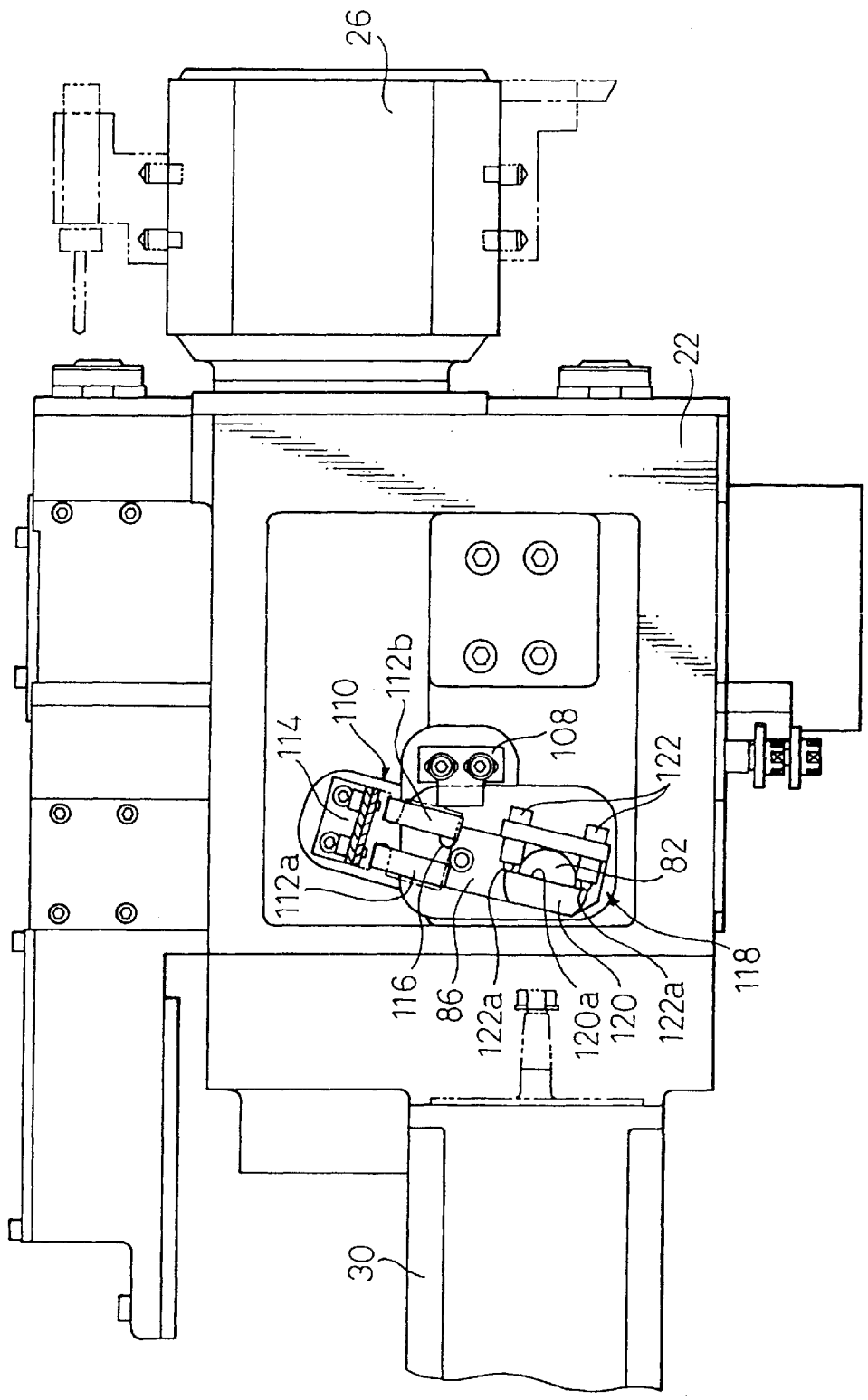
FIG. 12 is a plan view of the turret tool rest in FIG. 1.

As shown in FIGS. 4 and 12, the sensing unit 110 includes a pair of sensors 112 disposed near the stop member 108 and above the follower member 76 of the interlocking device 72 of the clutch drive mechanism 34. These sensors 112 are proximity sensors, such as metal-sensing type magnetic sensors, and are fixed to the tool rest body 22 through a bracket 114. On the other hand, a metal dog 116 is formed on the follower member 76 of the interlocking device 72 so as to project from the top surface of the upper second lever 86.

The sensing unit 110 with the above structure is arranged so that, in a state where the annular clutch member 60 of the clutch unit 32 is completely connected to the clutch shaft 58, the dog 116 provided on the second lever 86 of the follower member 76 of the interlocking device 72 approaches one sensor 112a (located rearward in the axial direction of the clutch shaft 58) to excite (or turn on) the sensor 102a, and that, in a state where the annular clutch member 60 is completely engaged with the stop member 108, the dog 116 on the second lever 86 of the follower member 76 approaches another sensor 112b (located frontward in the axial direction of the clutch shaft 58) to excite the sensor 112b.

Consequently, if the sensor 112a is not turned on in spite of the fact that the tool rest body 22 is located at a position (corresponding to P3 in FIG. 5A) where the annular clutch member 60 should be completely connected to the clutch shaft 58 due to the rotation of the follower member 76 following the movement of the tool rest body 22 in the X-axis direction as described, this is detected as the inadequate engagement of the clutch unit 32, and certain measures, such as sounding of an alarm or a suspension of operation, are directed. In the similar way, if the sensorf 112b is not turned on in spite of the fact that the tool rest body 22 is located at a position (corresponding to P2 in FIG. 5A) where the annular clutch member 60 should be completely engaged with the stop member 108, this is also detected as the inadequate engagement, and certain measures, such as the sounding of an alarm or a suspension of operation, are also directed.

In this arrangement, it is preferred that, to surely prevent the clutch unit components from breaking due to the inadequate engagement of the clutch unit 32, a torque absorbing mechanism 118 for absorbing a torque of the follower member 76 when the inadequate engagement occurs is used together with the sensing unit 110. As shown in FIG. 12, the torque absorbing mechanism 118 includes a shaft head 120 having a generally trapezoidal shape as seen in a plan view and fixed to the upper end of the joint shaft 82 of the follower member 76 to project from the top surface of the second lever 86, and a pair of ball plungers 122 fixed to the second lever 86 of the follower member 76. These ball plungers 122 are disposed side-by-side and generally orthogonal to the center axis 82a of the joint shaft 82, and respective ball-ends 122a thereof are abutted to a flat lateral side 120a of the shaft head 120. Accordingly, in this case, the joint shaft 82 of the follower member 76 is not directly fixed to the second lever 86, and a torque is transmitted therebetween through the shaft head 120 and the pair of ball plungers 122.

Figure 13:
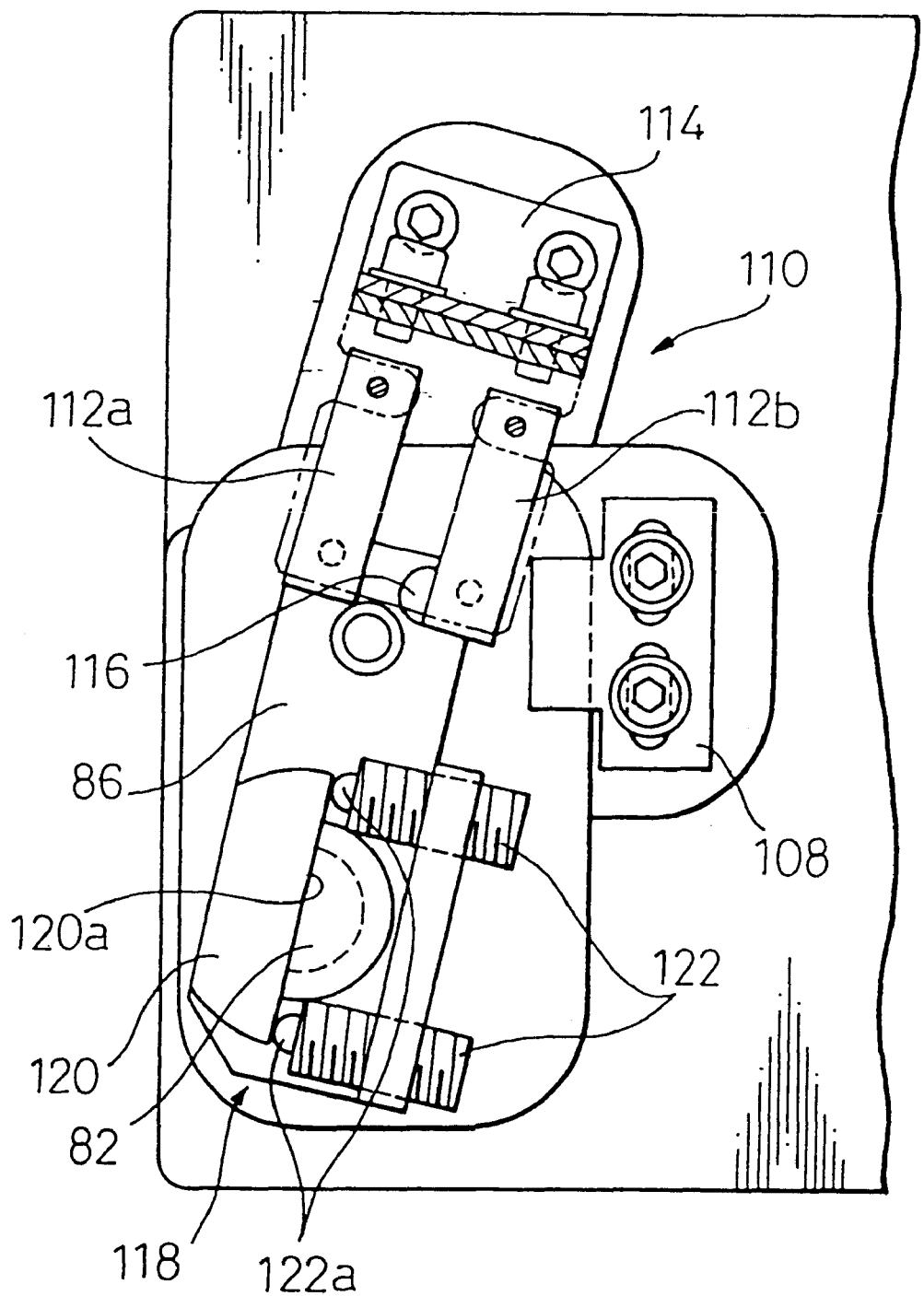
FIG. 13 is an partially-enlarged plan view of the turret tool rest in FIG. 1.

Thus, for example, if the annular clutch member 60 is smoothly engaged with the stop member 108 when the clutch unit 32 is transferred from the connecting state to the releasing state, the torque is transmitted in a stable manner between the joint shaft 82 of the follower member 76 and the second lever 86 through the shaft head 120 and the pair of ball plungers 122 as shown in FIG. 13, and thereby the annular clutch member 60 is completely engaged with the stop member 108. In the meanwhile, the torque is applied to both the ball plungers 122 in a balanced manner. When the engagement is completed, the sensor 112b of the sensing unit 110 detects the approach of the dog 116 on the second lever 86 and generates an ON signal. In this condition, the sensor 112a is in an OFF state, whereby it is determined that the clutch unit 32 normally operates.

Figure 14A:
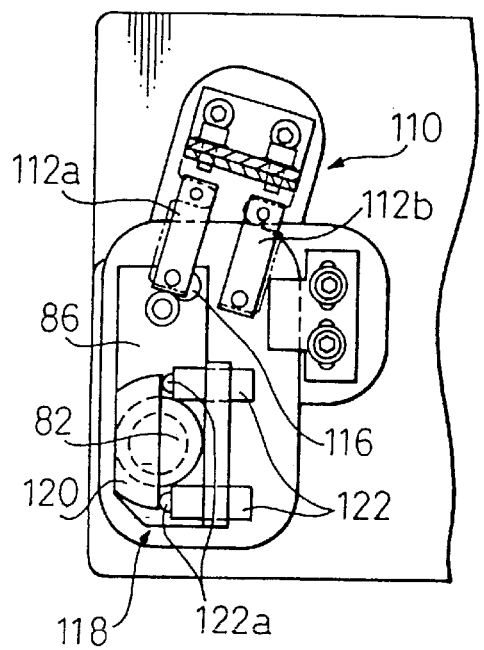
FIGS. 14A to 14C are illustrations for describing the operation of a sensing unit and of a torque absorbing mechanism of the turret tool rest in FIG. 1.

Then, if the annular clutch member 60 is smoothly engaged with the clutch shaft 58 when the clutch unit 32 is transferred from the releasing state to the connecting state, the torque is transmitted in a stable manner between the joint shaft 82 of the follower member 76 and the second lever 86 through the shaft head 120 and the pair of ball plungers 122 as shown in FIG. 14A, and thereby the annular clutch member 60 is completely engaged with the clutch shaft 58. In the meanwhile, the torque is applied to both the ball plungers 122 in a balanced manner. When the engagement is completed, the sensor 112a of the sensing unit 110 detects the approach of the dog 116 on the second lever 86 and generates an ON signal. In this condition, the sensor 112b is in an OFF state, whereby it is determined that the clutch unit 32 normally operates.

Figure 14B:
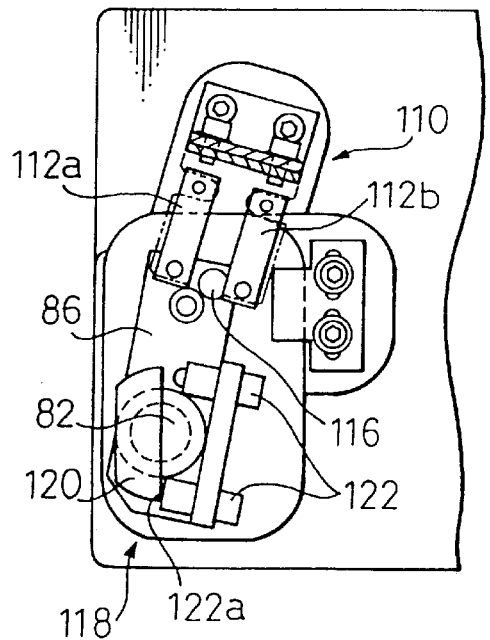

Contrary to this, if the annular clutch member 60 fails to engage with the clutch shaft 58 when the clutch unit 32 is transferred from the releasing state to the connecting state, the rotation of the second lever 86 of the follower member 76 is interrupted, but on the other hand the joint shaft 82 continues to rotate while the torque thereof is absorbed by the torque absorbing mechanism 118, as shown in FIG. 14B. In the meanwhile, the torque is excessively applied to one of the ball plungers 122 (the lower one in the drawing) to push the ball-end 122a of this ball plunger 122. Accordingly, when the tool rest body 22 has reached a position where the engagement should be completed, the sensor 112a of the sensing unit 110 has not yet detected the approach of the dog 116 on the second lever 86 and is left in the OFF state. As a result, with reference also to the OFF state of the sensor 112b, it is determined that the operation of the clutch unit 32 is abnormal, i.e., the engagement is inadequate.

Subsequently, in the case where the annular clutch member 60 is smoothly engaged with the stop member 108 when the clutch unit 32 is transferred from the connecting state to the releasing state, the condition as shown in FIG. 13 is obtained as described.

Figure 14C:
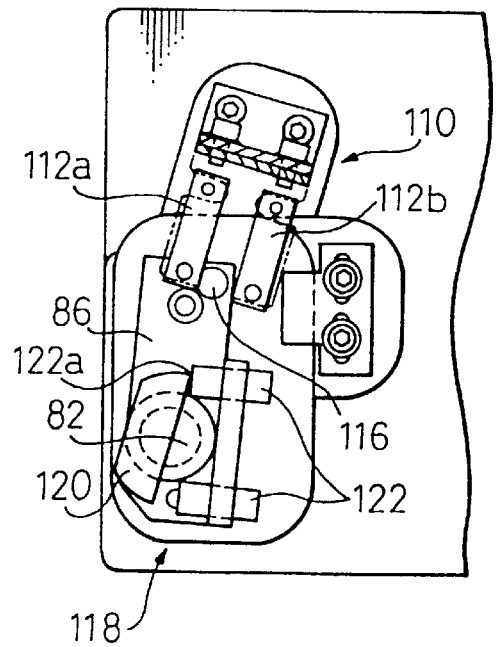

Contrary to this, if the annular clutch member 60 fails to engage with the stop member 108 when the clutch unit 32 is transferred from the connecting state to the releasing state, the rotation of the second lever 86 of the follower member 76 is interrupted but, on the other hand the joint shaft 82 continues to rotate while the torque thereof is absorbed by the torque absorbing mechanism 118, as shown in FIG. 14C. In the meanwhile, the torque is excessively applied to the other of the ball plungers 122 (the upper one in the drawing) to push the ball-end 122a of this ball plunger 122. Accordingly, when the tool rest body 22 has reached a position where the engagement should be completed, the sensor 112b of the sensing unit 110 has not yet detected the approach of the dog 116 on the second lever 86 and is left in the OFF state. As a result, with reference also to the OFF state of the sensor 112a, it is determined that the operation of the clutch unit 32 is abnormal, i.e., the engagement is inadequate.

As described above, the turret tool rest 10 is structured so that the same servomotor 30, which is the drive source for the indexing rotation of the turret 26, can be also used as a clamp/unclamp drive source for fixedly holding the turret 26 at the indexed position on the tool test body 22 and releasing the same. Accordingly, it is possible to accomplish the electrical motorization of the clamp/unclamp drive mechanism without incorporating additional servomotors, and therefore, it is possible to obtain several effects, such as the mitigation of noise or atmospheric pollution, the saving of energy consumption, the improvement of response accuracy, the reduction of production and operating cost, and so on, as well as to facilitate the further reduction of dimensions and the further improvement of performance of a machine tool incorporating the turret tool rest.

Moreover, the stop member 108 is provided for inhibiting the rotation of the annular clutch member 60 of the clutch unit 32, so that it is possible to prevent the turret 26 from unnecessarily freely rotating when the engaging unit 36 is put into the disengaged state. Also, the sensing unit 110 and the torque absorbing mechanism 118 are provided, so that it is possible to surely prevent the components of the clutch unit 32 from breaking. Thus, a high level safety is given to the turret tool rest 10.

Although the present invention has been explained with reference to the preferred embodiments, it should be noted that the present invention is not limited thereto but includes various modifications and changes. For example, as a drive mechanism for operating the clutch unit, an exclusive actuator such as a solenoid or others may be used in place of the above-described interlocking device 72.

INDUSTRIAL APPLICABILITY

The present invention is directed to a turret tool rest that can accomplish the electrical motorization of the clamp/unclamp drive mechanism for fixedly securing a turret at an indexed position on a tool rest body and releasing the same, without incorporating additional servomotors. Therefore, when the turret tool rest according to the present invention is mounted to a machine tool such as an automatically operated lathe, it is possible to obtain several effects, such as the mitigation of noise or atmospheric pollution, the saving of energy consumption, the improvement of response accuracy, the reduction of production and operating cost, and so on, as well as to facilitate the further reduction of dimensions and the further improvement of performance of a machine tool incorporating the turret tool rest.

What is claimed is:

1. A turret tool rest, comprising:
   a base;
   a tool rest body movably provided on said base;
   a turret rotatably supported on said tool rest body, said turret permitting desired tools to be individually mounted at predetermined angularly-indexed positions;
   an electric motor for rotationally driving said turret;
   a clutch unit arranged between said turret and said electric motor, said clutch unit operatively connecting said turret with said electric motor in a releasable manner;
   a drive mechanism for operating said clutch unit in association with movement of said tool rest body on said base;
   an engaging unit arranged between said tool rest body and said turret, said engaging unit engaging said turret with said tool rest body in a disengageable manner; and
   a power transmission device arranged between said electric motor and said engaging unit, said power transmission device transmitting an output of said electric motor to said engaging unit so as to operate said engaging unit;
   wherein, when said engaging unit is in a disengaged state, said clutch unit is set in a connecting state and an indexing rotation of said turret is caused by said electric motor, and when said clutch unit is in a releasing state, said engaging unit is set in an engaged state and said turret is secured at an indexed position on said tool rest body.

2. A turret tool rest as set forth in claim 1, wherein said drive mechanism includes an interlocking device for operating said clutch unit in association with the movement of said tool rest body on said base.

3. A turret tool rest as set forth in claim 2, wherein said interlocking device includes a cam provided on said base and a follower member provided on said tool rest body to be slidably engaged at one end with said cam and operatively connected at another end with said clutch unit, said clutch unit being operated due to a rotation of said follower member generated by the movement of said tool rest body on said base.

4. A turret tool rest as set forth in claim 1, wherein said clutch unit includes a clutch shaft coupled to an output shaft of said electric motor for rotation and a rotatable annular clutch member arranged coaxially with said clutch shaft and connected to said turret, said annular clutch member being engageable and disengageable with said clutch shaft.

5. A turret tool rest as set forth in claim 4, wherein said turret includes an index gear fixedly provided and arranged coaxially with said turret, and wherein said annular clutch member is provided on an outer periphery with a toothed portion for meshing with said index gear.

6. A turret tool rest as set forth in claim 4, wherein said clutch shaft is provided on an outer periphery thereof with a meshing portion, and wherein said annular clutch member is attached to said clutch shaft in an axially movable and rotatable manner, said annular clutch member being provided on one axial end thereof with a corresponding meshable portion for meshing with said meshing portion in a disengageable manner.

7. A turret tool rest as set forth in claim 4, further comprising a sensing unit for sensing an inadequate engagement of said clutch shaft with said annular clutch member.

8. A turret tool rest as set forth in claim 7, further comprising a power absorbing mechanism for absorbing an output of said drive mechanism when the inadequate engagement of said clutch shaft with said annular clutch member is generated.

9. A turret tool rest as set forth in claim 4, further comprising a stop member for being engaged with said annular clutch member to stop a rotation of said annular clutch member when said annular clutch member is disengaged from said clutch shaft.

10. A turret tool rest as set forth in claim 9, wherein said stop member is arranged to stop the rotation of said annular clutch member before said annular clutch member is completely disengaged from said clutch shaft.

11. A turret tool rest as set forth in claim 10, further comprising a sensing unit for sensing an inadequate engagement of said stop member with said annular clutch member.

12. A turret tool rest as set forth in claim 11, further comprising a power absorbing mechanism for absorbing an output of said drive mechanism when the inadequate engagement of said stop member with said annular clutch member is generated.

13. A turret tool rest as set forth in claim 1, wherein said engaging unit includes an immovable-side engaging element provided on said tool rest body and a movable-side engaging element provided on said turret, and wherein said power transmission device moves said movable-side engaging element between an engaged position for engagement with said immovable-side engaging element to stop a rotation of said turret and a disengaged position for disengagement from said immovable-side engaging element to permit the rotation of said turret.

14. A turret tool rest as set forth in claim 13, wherein said power transmission device includes a feed screw arrange ment provided on said turret and a gear train for connecting an output shaft of said electric motor to a rotating element of said feed screw arrangement.

15. A turret tool rest as set forth in claim 14, wherein said rotating element of said feed screw arrangement is arranged to rotate synchronously with said turret in an identical direction during the indexing rotation of said turret.

16. An automatically operated lathe including a turret tool rest, comprising:

a lathe bed;

a base provided on said lathe bed;

a tool rest body movably provided on said base;

a turret rotatably supported on said tool rest body, said turret permitting desired tools to be individually mounted at predetermined angularly-indexed positions;

an electric motor for rotationally driving said turret;

a clutch unit arranged between said turret and said electric motor, said clutch unit operatively connecting said turret with said electric motor in a releasable manner;

a drive mechanism for operating said clutch unit in association with a movement of said tool rest body on said base;

an engaging unit arranged between said tool rest body and said turret, said engaging unit engaging said turret with said tool rest body in a disengageable manner; and a power transmission device arranged between said electric motor and said engaging unit, said power transmission device transmitting an output of said electric motor to said engaging unit so as to operate said engaging unit;

wherein, when said engaging unit is in a disengaged state, said clutch unit is set in a connecting state and an indexing rotation of said turret is caused by said electric motor, and when said clutch unit is in a releasing state, said engaging unit is set in an engaged state and said turret is secured at an indexed position on said tool rest body.

* * * * *